S. M. NICKERSON & J. P. TANSEY.
Sash-Lock.

No. 228,472. Patented June 8, 1880.

Witnesses

Inventors
Sparrow M. Nickerson
and James P. Tansey
By
Attorneys

UNITED STATES PATENT OFFICE.

SPARROW M. NICKERSON AND JAMES P. TANSEY, OF CHICAGO, ILLINOIS; SAID TANSEY ASSIGNOR TO SAID NICKERSON.

SASH-LOCK.

SPECIFICATION forming part of Letters Patent No. 228,472, dated June 8, 1880.

Application filed October 25, 1879.

*To all whom it may concern:*

Be it known that we, SPARROW M. NICKERSON and JAMES P. TANSEY, of Chicago, in the county of Cook and State of Illinois, have invented certain new and useful Improvements in Sash-Locks, which are fully described in the following specification, reference being had to the accompanying drawings, in which—

Figures 1, 2:
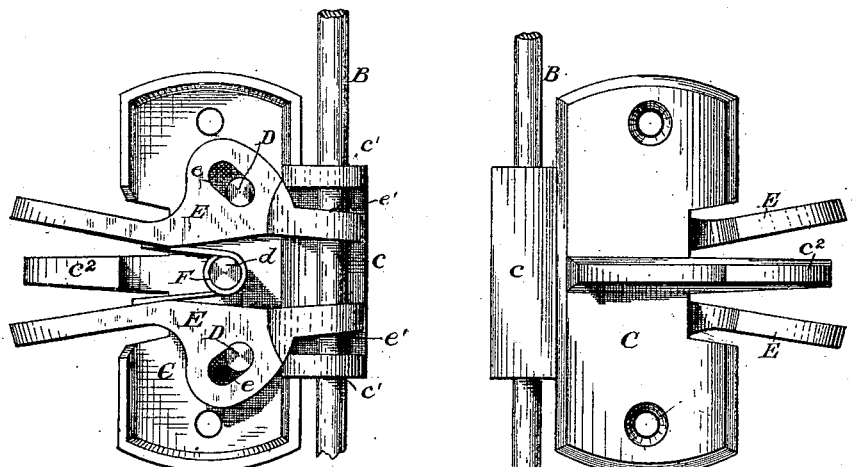
Figure 3:
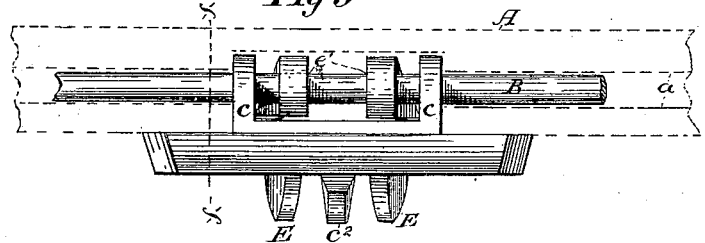
Figure 4:
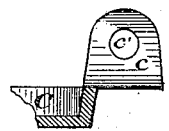
Figure 5:
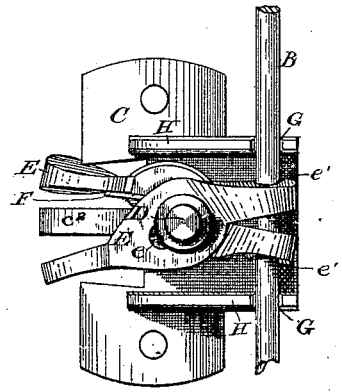
Figure 6:
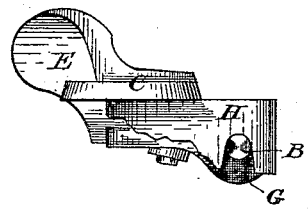

Figure 1 represents a front elevation of the sash-lock containing our improvements as it appears in place; Fig. 2, a view of the same reversed; Fig. 3, an edge view of the same, with a part of the sash shown in dotted lines; Fig. 4, a detail section, showing a part of the case, taken on line $x\,x$, Fig. 3; Fig. 5, a back elevation of a lock, showing some modifications in construction; Fig. 6, a plan view of the same, and Fig. 7 a perspective view of one of the dogs in this modified construction.

Our invention relates to an improvement in sash-locks of the description shown in Letters Patent No. 202,154, granted April 9, 1878.

In the above-mentioned patent the dogs or catches are fixed on a pivot, on which they are vibrated, and hence there is but a single biting surface or point on each dog which is brought into contact with the rod, and unless the dogs are vibrated so as to bring them into this single position, in which they bite the rod, they are inoperative. Our improvement is intended to obviate this difficulty by giving the dogs a limited amount of movement or play on their pivots, thereby obtaining a greater range of the biting-action on the rod. This we accomplish by slotting the dogs and passing the pivots on which they turn through the slots.

In the drawings, A (in dotted lines, Fig. 3 of the drawings) represents a portion of a window-sash, which is provided with a longitudinal groove, $a$, to receive the holding-rod B, as in the patent referred to above.

The case C is attached to the side of the sash, and at one edge has inwardly-projecting lugs $c$, through which holes $c'$ are made for the reception of the rod B, the lugs projecting inward sufficiently to enable the rod to be passed through them, and the edge of the sash being cut away for this purpose. On the other edge of the case is a single stop-piece, $c^2$, projecting centrally from the edge of the case. Preferably we pivot the dogs separately within the case, and hence provide two stud-pins or pivots, D, projecting from the inside of the case, on which the dogs E are mounted, respectively. Each of these dogs E has an inclined slot, $e$, in the body thereof, in which the pivots D are placed, and at their inner ends they are bent inward slightly and provided with holes $e'$, through which the holding-rod is passed, these perforated ends being extended inward and arranged between the lugs C when the device is fastened to the sash. The other ends of the dogs project outward through the inner edge of the case, and terminate in thumb-pieces above and below the central stop, $c^2$. A central stud-pin, $d$, also projects from the inside of the case, upon which a spring, F, is coiled, the free ends of which are arranged to bear, respectively, against the dogs or catches E, the bearing-points being outside of the pivotal points, as shown in Fig. 2 of the drawings.

The operation of this device is, in a general way, similar to the lock shown in the patent before mentioned; but it is obvious that as the dogs have some lateral play on their pivots by reason of the slots therein they will bite the holding-rod quicker and through a greater range of vibration of the dogs than in the case of the patent, where there is no play upon the pivots. Hence the fastening becomes more certain of action, and requires less adjustment, and is not rendered inoperative by the slots wearing off the dogs, occasioned by use.

We also obtain a desirable result from the pivoting of the dogs independently within the case. We are thus enabled to make a very shallow case, which can be attached to the sash without cutting away, except a very small portion at the extreme outer edge thereof, for the accommodation of the holding-lugs. The sash is not weakened, therefore, as is the case with the fastening in the patent above mentioned.

Figure 7:
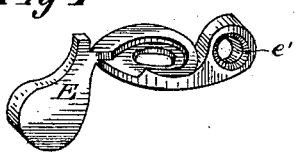

Our improvement in giving movement to the dogs on their pivot is, however, applicable to a single pivot-fastening, and this construction and arrangement we have shown in Fig. 5 of the drawings, in which the dogs E are mounted upon a single pivot-pin, but are provided with slots $e$, so as to have a slight lateral play thereon, the same as in the former case. The shape of the dogs when this modification is used is shown in Fig. 7 of the drawings. In this modification we have also shown a slight modification in the construction of the case. Instead of having perforated lugs through which the holding-rod is passed, there are simply notches G, made in the flanges H, which project inward and are let into the sash. These notches are sufficient for the purpose of holding the rod in proper position with reference to the dogs. This means of holding the rod is applicable to the case constructed as shown in Figs. 1 and 2 of the drawings, and may be used whether the dogs are mounted on independent pivots or on the same pivot. In this form of the device it will be noticed that the flanges are deep enough to cover and protect the body of the dogs, as shown in Fig. 6 of the drawings, and must be let into the sash, thereby requiring a corresponding cut of the latter.

We have found this sash-fastening, with our improvement, very satisfactory in its operation, being efficient, certain in action, and not destroyed in utility by the wear due to short use.

It will be understood, of course, that this fastening locks the sash from movement in either direction, the same as in the patented invention described in the Patent No. 202,154. Of course the precise form and arrangement of some of the parts herein shown and described may be changed to suit the particular location where the device is to be applied.

Having thus described our invention, what we claim as new, and desire to secure by Letters Patent, is—

1. The combination, with the shield or case C, secured to the sash and having lugs or guides for the sash-rod projecting therefrom, of a rod, B, attached to the frame, a pair of spring-actuated dogs E, pivoted within such case and provided with inclined slots $e$, in which the pivot-pins work, substantially as described.

2. The case or shield C, provided with lugs, through which the sash-rod passes, in combination with pivoted slotted dogs E, arranged to fit upon such sash-rod, and a spring, F, all constructed and arranged substantially as and for the purposes set forth.

SPARROW M. NICKERSON.
JAMES P. TANSEY.

Witnesses:
J. M. THACHER,
F. L. MIDDLETON.